June 9, 1931.  G. J. MEYER  1,809,135
MILK TREATING APPARATUS
Filed Nov. 14, 1928  2 Sheets-Sheet 1

INVENTOR.
George J. Meyer
BY Erwin, Wheeler & Woolard
ATTORNEYS

June 9, 1931. G. J. MEYER 1,809,135
MILK TREATING APPARATUS
Filed Nov. 14, 1928 2 Sheets-Sheet 2
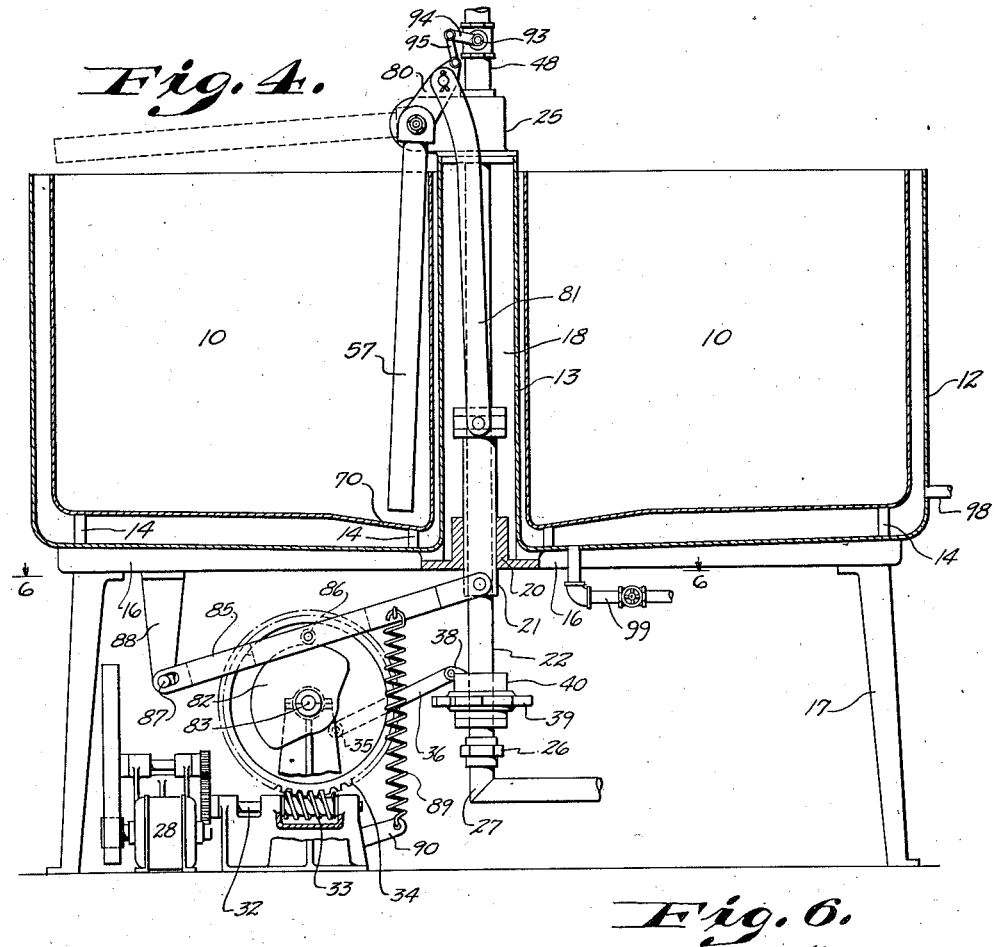
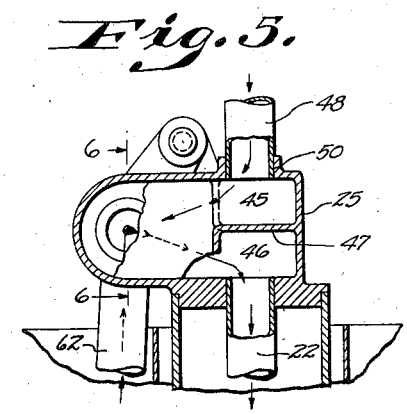
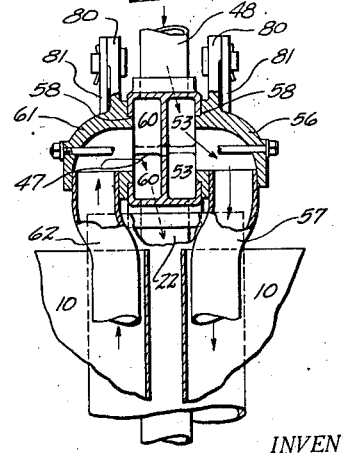
INVENTOR.
George J. Meyer
BY
Erwin, Wheeler & Woolard
ATTORNEYS Patented June 9, 1931

1,809,135

UNITED STATES PATENT OFFICE

GEORGE J. MEYER, OF MILWAUKEE, WISCONSIN, ASSIGNOR TO GEO. J. MEYER MANUFACTURING CO., OF MILWAUKEE, WISCONSIN, A CORPORATION OF WISCONSIN

MILK TREATING APPARATUS

Application filed November 14, 1928. Serial No. 319,207.

My invention relates to improvements in milk treating apparatus of the general class known as pasteurizing apparatus although the apparatus herein disclosed may be employed for other purposes.

The primary object of the invention is to provide improved means for successively filling and emptying a series of milk holding chambers in such a manner as to allow the required interval for the treatment of the milk between filling and emptying operations while filling and emptying operations are being performed with reference to other chambers in the series, thus making the operation continuous.

More specifically stated, the object is to provide filling and emptying mechanism in association with an endless series of stationary milk chambers to which in-feeding and out-feeding portions of the mechanism may be successively transferred in a manner to allow the in-feeding and out-feeding operations to proceed substantially continuously, the only interruptions being those required for the necessary transfers from one set of chambers to the next in the series.

Still further objects involve questions of sanitation, simplicity, and durability in structure, economy of time in operation, and efficiency.

In the drawings—

Figure 4 is an elevation with the milk chambers and their jackets illustrated in vertical section drawn generally on line 4—4 of Figure 1;

Figure 5 is a detail view partly in elevation and partly in section, showing an enlarged fragment of the transfer head and associated parts;

Figure 6 is a sectional view of the same fragment illustrated in Figure 5 taken on line 6—6 of Figure 5.

Like parts are identified by similar reference characters throughout the several views.

Figure 1:
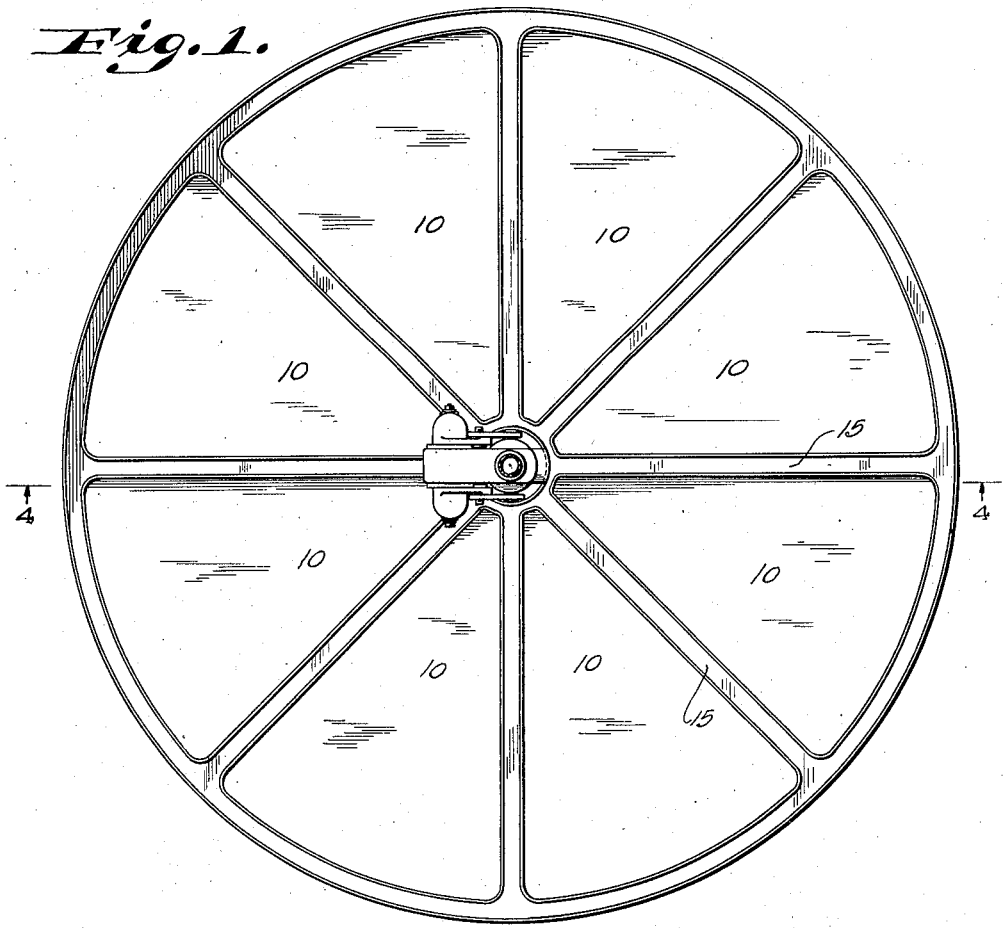
Figure 1 is a plan view of a set of jacketed milk chambers arranged in an annular series with associated in-feeding and out-feeding mechanism, the in-feeding pipe being disclosed in horizontal section.

In Figure 1 a series of eight milk vats or chambers 10 is illustrated. These are provided with radial side walls and an arcuate outer wall, each member being substantially triangular in horizontal section with the corners or apexes rounded to facilitate cleansing operations. These chambers are mounted within a jacket having inner and outer annular walls 12 and 13. The milk chambers 10 may be loosely supported within the jacket in spaced relation to the bottom thereof by legs 14 and the chambers 10 have their radial walls spaced from each other thus providing radial liquid receiving jacket spaces 15 between the chambers.

The inner annular wall 13 of the jacket provides a tubular passage 18 and the jacket is mounted upon the top 16 of a suitable table, the legs 17 of which support the table top and jacket at a sufficient height above the floor to allow for the installation of the motor and operating connections of the transfer mechanism hereinafter to be described.

The table top is provided with a bearing 20 through which a vertically movable sleeve 21 extends and an out-feeding milk pipe 22 extends through this sleeve and through the tubular passage 18, with its upper end connected to a transfer head 25 and its lower end connected by a coupling 26 with the stationary elbowed out-feeding pipe section 27 leading to any suitable point of delivery.

This vertical pipe section 22 is rotated step by step, the power for such motion being transmitted from a motor 28 through the motor shaft and its pulley 29 (Figure 3), belt 30, pulley 31, worm shaft 32, worm 33, (Figure 4), worm wheel 34, crank pin 35 on the side face thereof, connecting rod 36, oscillatory arm 37, pawl 38 and ratchet wheel 39, the latter being fast on the pipe section 22.

The oscillatory arm 37 has a collar 40 which is mounted upon a hub 41 associated with the ratchet wheel 38, whereby the dog 39 may be reciprocated in an arcuate path to actuate the ratchet. A spring 42 may be employed to hold the dog in operative engagement with the ratchet wheel while allowing it to yield during the retractive stroke when it passes over the point of a ratchet tooth to position for engagement therewith during the next actuating stroke.

Figure 2:
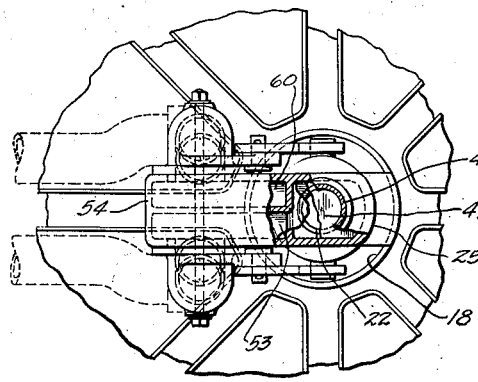
Figure 2 is an enlarged fragment of the central portion in plan and partially broken away in a horizontal section showing the in-feeding and out-feeding mechanism, with dotted lines indicating the swinging in-feeding and out-feeding pipe sections in a position for a transferring operation.

The head 25 may be fixed to the rotary pipe section 22 to rotate step by step therewith when actuated by the ratchet mechanism. This head 25 is chambered, as shown in Figures 2, 5, and 6, its receiving and outlet cavities 45 and 46 being separated by a horizontal partition 47, as best illustrated in Figure 5. The receiving cavity 45 receives milk from an overhead source of supply through a supply pipe 48. It is not material to the invention herein described whether the pipe 48 rotates with the head or whether it is stationary inasmuch as the head 25 may have its hub 50 mounted for rotation on the lower end of the pipe 48. It is not necessary that any pressure should be built up in the cavity 45 and the hub 50 may be made of any length necessary to prevent leakage of milk between it and the pipe 48.

The milk received in the cavity 45 is delivered through passage 53 in the arm 54. The arm 54 is ported for side delivery into the ported elbow 56, the latter being adapted for downward delivery to the in-feeding pipe 57 and being also rotatively mounted at 58 upon the arm 54.

The arm 54 has two passages. The passage 53 leads from the receiving cavity 45 of the head and a parallel passage 60 leads to the cavity 46 from the ported elbow 61 connected with the out-feeding pipe 62. This elbow 61 is journalled to the arm 54 on the opposite side from that occupied by the elbow 56 (Figure 6) and allows milk to flow from the pipe 62 upwardly into the passage 60 and thence to the cavity 46, from which it is delivered downwardly through the rotary outlet pipe section 22, as best shown in Figure 5.

The in-feeding and out-feeding pipes 57 and 62 have their lower portions parallel with each other and spaced apart just far enough to allow them to enter adjacent milk chambers 10, each pipe being received in the inner apex of the chamber which it enters. Each of the chambers 10 has its bottom downwardly inclined at or near the apex, as indicated at 70 in Figure 4, whereby the lower ends of the in-feeding and out-feeding pipes may be received within the depression thus formed so that milk may be delivered into the chamber with minimum agitation and may be almost wholly removed from the chamber through the out-feeding pipe 62 inasmuch as the milk in the chamber will drain into this depression and be sucked up through the outlet pipe by a siphoning or a pumping action.

In order that the in-feeding and out-feeding pipes 57 and 62 may be transferred from one set of chambers 10 to the next, it is necessary that they be lifted to a horizontal position in a plane above the chambers 10 preparatory to such transfer. The ported elbows 56 and 61 allow for this movement because their inner ends are journalled in the outlet ports of the passages 53 and 60 respectively. These elbows 56 and 61 are each provided with an actuating arm 80 and the arms 80 are connected by links 81 with the sleeve 21 whereby a downward movement of the sleeve will be transmitted through the links 81 and arms 80 to impart a rotative movement to the respective elbows 56 and 61 and lift their associated in-feeding and out-feeding pipes 57 and 62 to the horizontal position in which they are indicated in dotted lines in Figures 2 and 4.

To actuate the sleeve 21 at the proper time for the purpose of lifting the in-feeding and out-feeding pipes, a cam 82 is mounted upon the worm wheel shaft 83 and a lever 85 is provided with roller 86 in a position to bear upon the periphery of the cam. The lever 85 has a loose fulcrum connection at 87 with a bracket 88 connected with the table top 16. A tension spring 89 connects the lever with another bracket or arm 90 associated with the bed upon which the motor and associated mechanism are mounted, whereby the roller 86 is held in continuous contact with the cam surface.

Figure 3:
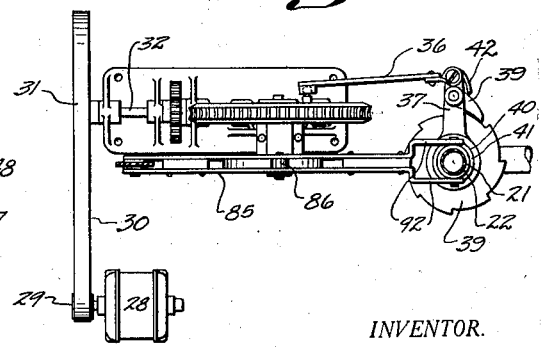
Figure 3 is a plan view of the actuating mechanism for transferring the in-feeding and out-feeding connections from one set of milk chambers to the next.

The lever is preferably formed of parallel bars adapted to straddle the cam and the roller 86 is mounted between the parallel bars, as best shown in Figure 3. The working ends of the lever form forked arms 92 which are pivoted to opposite sides of the sleeve 21. When the cam lifts the lever 85 to its full line position, as indicated in Figure 4, the in-feeding and out-feeding pipes 57 and 62 will be lowered into operating position in which these pipes will extend downwardly along substantially vertical lines into the milk chambers 10. But, when the rotation of the cam brings its shorter radii into registry with the roller 86, the lever will be pulled downwardly by the spring 89 to raise the pipes 57 and 62 out of the milk chambers 10. This movement will be timed to occur immediately prior to an actuating stroke of the pawl 38 against one of the teeth of the ratchet 39.

During the retractive movement of the pawl 38, and also during that portion of its advancing movement prior to its pressure engagement with a ratchet tooth for rotatively actuating the ratchet, one of the milk chambers 10 will be filled through the supply pipe 48 and in-feeding pipe 57. The adjacent chamber 10 will be simultaneously emptied by withdrawal of milk through the outfeeding pipe 62 by either a pumping or a siphoning operation. The filling of one tank and the emptying of another having thus been accomplished, the cam 82 will release the lever 85 for a downwardly swinging movement due to the pull of the spring 89, which movement is transmitted, as above described, to raise the pipes 57 and 62 to a horizontal position above their associated tanks 10. By the time these pipes 57 and 62 have reached a position wholly above the tanks 10, the ratchet wheel 39 will be actuated to rotate the head 25 with its associated pipe section 22 a distance sufficient to bring the in-feeding pipe 57 into registry with the tank 10 that has just been emptied and to also bring the out-feeding pipe 62 into registry with the next tank of the series, which tank has been filled by the inlet pipe during a preceding revolution of the ratchet wheel and associated mechanism. Thereupon, cam 82 again lifts the lever 85 and the motion of the latter is transmitted through sleeve 21 and arms 80 to lower the pipes 57 and 62 into the tanks 10 with which they are then in registry. The in-feeding pipe will thereupon fill the only empty tank 10 in the series, i. e., the tank which has just been emptied in the preceding operation.

If desired, the delivery of milk through the pipe 48 may be manually shut off preparatory to the raising of the pipe 57 to its horizontal position, although the milk delivery may be automatically controlled by a valve at 93 having an operating arm 94 connected to the arm 80 by a link 95 which closes the valve 93 during the initial upwardly swinging movement of the in-feeding pipe 57 and again opens it during the final downward movement of this pipe.

It will, of course, be understood that the jacket space will be filled with liquid. For example, when the device is used for pasteurizing purposes, the jacket space will be filled with a liquid at a pasteurizing temperature, the liquid being supplied through a supply pipe 98 and delivered through a pipe 99.

I claim:

1. Milk treating apparatus comprising a series of jacketed chambers in combination with a pipe system having infeeding and outfeeding pipe sections provided with supply and exhaust connections, each set of pipe sections including one member permitting swinging movement upon a horizontal axis, and another member permitting swinging movement upon a vertical axis, each such member being ported for milk flow therethrough; each set of pipe sections also having one member of a length substantially equal to the depth of the jacketed chambers and adapted to swing into and out of an associated chamber upon the axis of its horizontal pivot member, and means for actuating said pipe section to swing them into and out of said chambers successively.

2. Milk treating apparatus including the combination with a series of chambers adapted to receive the milk to be treated, and a set of swinging out-feeding and in-feeding pipes having an elbowed supporting and communicating connection pivoted for swinging movement about a horizontal axis to allow said pipes, in one position, to extend to the bottom portions of adjacent chambers and in another position to extend wholly above said chambers, and means for transferring the pipes respectively to other adjacent chambers when in the last mentioned position.

3. Milk treating apparatus comprising an annular series of treating chambers and a set of out-feeding and in-feeding pipe sections each having a horizontally pivoted elbowed member and a pipe arm adapted to swing in a vertical plane about the axis of the pivot into and out of pairs of adjacent chambers in the series, said pipe arms also having a common feeding member pivoted for swinging movement about a vertical axis when the elbowed arms are raised above said chambers, and timed mechanism for automatically moving said sections in successive lifting transferring and re-inserting operations for filling and emptying said chambers successively.

4. Milk treating apparatus comprising an annular series of milk receiving chambers, a central head rotatable about a vertical axis and sub-divided into cavities and ported to provide inlets and outlets for each cavity, in-feeding and out-feeding pipe sections journalled to the outlet port of one cavity and to the inlet port of the other along a horizontal axial line and adapted to be swung downwardly into adjacent chambers or upwardly to positions above the chambers, supply and delivery pipes connected with the other ports of said cavities in the head, mechanical means for raising the journalled pipe sections above the chambers and co-operating mechanical means for rotating the head while said pipe sections are in the raised position whereby said sections may be transferred from one set of chambers to another.

5. Milk treating apparatus comprising the combination of an annular series of jacketed treating chambers, a centrally disposed delivery pipe, a rotary head at the upper end of the delivery pipe provided with a cavity in communication with said pipe, and another cavity provided with an inlet port, a set of pipes movably connected with said head in communication with the respective cavities and adapted to swing in vertical planes, said set of pipes being disposed for movement into and out of adjacent milk chambers in the series, whereby when moved out of certain chambers they may be transferred to other chambers of the series by a rotative movement of said head.

6. Milk treating apparatus comprising the combination with a liquid container having a central vertically disposed tubular passage, an annular series of milk chambers grouped about said central passage within the container and having radially extending side walls spaced from those of adjacent chambers in the series, an outlet duct extending vertically through said tubular passage and provided with a chambered head rotatively supported at its upper end, said head having a plurality of chambers, one connected with said outlet duct and the other connected with a source of supply, swinging pipe connections leading from the respective chambers in the head and adapted in one position to connect such chambers with the bottom portions of adjacent milk treating chambers, and mechanical means for successively lifting said pipe sections from the milk treating chambers, imparting a partial rotation to the head and lowering said sections into adjacent chambers in a cycle of timed operations.

7. Milk treating apparatus, including the combination of an annular series of milk treating chambers, a centrally disposed rotary head provided with axially aligned milk inlet and outlet ports and pipe connections, a lateral extension on said head, having passages, one connected with the inlet port and the other with the outlet port of the head and having axially aligned lateral ports, a set of elbowed pipe connections journalled in said lateral ports and adapted to swing about the axis thereof into and out of adjacent milk treating chambers, whereby, when out of such chambers, they may be transferred to other chambers by rotation of the head.

8. Milk treating apparatus, including the combination of an annular series of milk treating chambers, a centrally disposed rotary head provided with axially aligned milk inlet and outlet ports and pipe connections, a lateral extension on said head having passages, one connected with the inlet port and the other with the outlet port of the head and having axially aligned lateral ports, a set of elbowed pipe connections journalled in said lateral ports and adapted to swing about the axis thereof into and out of adjacent milk treating chambers, whereby, when out of such chambers, they may be transferred to other chambers by rotation of the head, ratchet mechanism for rotating the head step by step, and reciprocatory mechanism for actuating said elbowed pipe sections to swing them in vertical planes in the intervals between operations of the ratchet mechanism.

9. Milk treating apparatus, comprising the combination of a container provided with a vertically extending centrally disposed passage, an annular series of milk treating chambers in the container grouped around said passage, a vertically disposed pipe extending through said passage and provided with a rotative head, pipe sections coupled to said head for swinging movement in a vertical plane into and out of adjacent milk treating chambers, means for delivering milk through the head into one of said pipe sections, means for withdrawing milk through the other pipe section, a motor driven lever for intermittently and simultaneously swinging said pipe sections into and out of milk chambers with which they are in registry, and co-operative ratchet feed mechanism for intermittently rotating the head and its supporting pipe.

10. Milk treating apparatus, comprising the combination of a container provided with a vertically extending centrally disposed passage, an annular series of milk treating chambers in the container grouped around said passage, a vertically disposed pipe extending through said passage and provided with a rotative head, pipe sections coupled to said head for swinging movement in a vertical plane into and out of adjacent milk treating chambers, means for delivering milk through the head into one of said pipe sections, means for withdrawing milk through the other pipe section, a motor driven lever for intermittently and simultaneously swinging said pipe sections into and out of milk chambers with which they are in registry, and co-operative ratchet feed mechanism for intermittently rotating the head and its supporting pipe, said supporting pipe having a sleeve loosely mounted thereon and connected with said lever, and links connecting the sleeve with said swinging pipe sections to raise and lower them with reference to the milk treating chambers.

11. In milk treating apparatus, the combination with an annular series of milk treating chambers, of a rotary head sub-divided into cavities one of which has a top port and the other a bottom port aligned with the top port along a vertical axis of head rotation, said head being also provided with laterally extending passages leading respectively from said cavities to a pair of ports aligned in a horizontal axis, swinging pipe connections journalled in said last mentioned ports and aligned pipe connections connected to the first mentioned ports.

12. In a milk treating apparatus, the combination with an annular series of milk treating chambers, of a chambered head having ports aligned along a horizontal axis, elbowed pipe connections journalled in said ports and adapted to swing in a vertical plane, actuating arms connected with the elbowed portions of said pipe connections, and power operated links connected with said actuating arms to operate them intermittently.

13. In a milk treating apparatus, the combination of a container having a tubular passage therethrough along its vertical center line, an annular series of closed bottom milk chambers in said container, a rotative pipe connection extending through said passage and provided with a head ported to receive milk from above for one of said chambers and to deliver it from another downwardly through said pipe, said head having relatively adjustable pipe connections movable into and out of registering chambers, power driven means for effecting a relative rotative step by step adjustment of said pipe head with reference to said series of chambers, and actuating connections extending through said passage for moving said pipe connections into and out of chambers successively and independently of the head movement.

14. In a milk treating apparatus, the combination with a milk receiving chamber, of pipe connections having a member with one end pivotally supported above and in proximity to one corner of said chamber, the depth and width of said chamber being such as to allow the free end of the pipe connection to be swung from a point in proximity to the chamber bottom to a point above the chamber.

15. In a milk treating apparatus, the combination with an annular series of milk chambers having side walls convergent toward a cylindrical central space about which said chambers are grouped, and supply and exhaust pipe connections having members pivoted to a rotary support and adapted to be swung upon their pivotal axes into positions with their free ends in the apices formed by said convergent walls each in close proximity to the bottom of its associated chamber, said chambers extending radially to a sufficient distance to allow the free ends of the pipes to be swung upwardly to positions above said chambers.

16. In a milk treating apparatus, the combination of a milk receiving chamber having its bottom downwardly inclined at one corner, and means for swinging supply and exhaust pipe connections downwardly into said chamber with their free ends in proximity to said inclined portions of the bottom.

17. In a milk treating apparatus of the described class, the combination of a pipe connection rotatable about a vertical axis and provided with two sets of passages, one having a supply connection and the other having an exhaust connection, said passages being provided at their other ends with members pivoted to swing about horizontal axes and provided respectively with a feed pipe in communication with the supply connection and a suction pipe in communication with the exhaust connection through said pivoted members and pipe connection.

GEORGE J. MEYER.